(12) United States Patent
Vosoughi et al.

(10) Patent No.: US 11,956,478 B2
(45) Date of Patent: Apr. 9, 2024

(54) METHOD AND APPARATUS FOR POINT CLOUD CHUNKING FOR IMPROVED PATCH PACKING AND CODING EFFICIENCY

(71) Applicant: TENCENT AMERICA LLC, Palo Alto, CA (US)

(72) Inventors: Arash Vosoughi, San Jose, CA (US); Sehoon Yea, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/732,498

(22) Filed: Jan. 2, 2020

(65) Prior Publication Data
US 2020/0221137 A1    Jul. 9, 2020

Related U.S. Application Data

(60) Provisional application No. 62/790,448, filed on Jan. 9, 2019.

(51) Int. Cl.
*H04N 19/176* (2014.01)
*H04N 19/86* (2014.01)
*H04N 19/90* (2014.01)

(52) U.S. Cl.
CPC .......... *H04N 19/90* (2014.11); *H04N 19/176* (2014.11); *H04N 19/865* (2014.11)

(58) Field of Classification Search
CPC .... H04N 19/90; H04N 19/176; H04N 19/865; H04N 19/17; H04N 19/20

USPC .................................................... 375/240.01
See application file for complete search history.

(56) References Cited

U.S. PATENT DOCUMENTS

| | | | |
|---|---|---|---|
| 11,575,935 B2 * | 2/2023 | Shin ..................... | H04N 19/172 |
| 11,575,936 B2 * | 2/2023 | Wang ................... | H04N 19/103 |
| 11,611,774 B2 * | 3/2023 | Yano .................... | H04N 19/597 |
| 11,677,922 B2 * | 6/2023 | Oh ....................... | H04N 13/161 |
| | | | 348/43 |

(Continued)

FOREIGN PATENT DOCUMENTS

| | | |
|---|---|---|
| WO | 2009/151661 A2 | 12/2009 |
| WO | 2017/142654 A1 | 8/2017 |
| WO | 2018/024972 A1 | 2/2018 |

OTHER PUBLICATIONS

Tim Galla and Reinhard Klein, Sep. 28-Oct. 2, 2015, Point Cloud Compression, pp. 5087-5092.*

(Continued)

*Primary Examiner* — Tung T Vo
(74) *Attorney, Agent, or Firm* — Sughrue Mion, PLLC

(57) ABSTRACT

A method and apparatus for encoding a video stream using video point cloud coding, the decoding including obtaining an input point cloud; dividing the input point cloud into a plurality of chunks, including a first chunk including a first plurality of points and a second chunk including a second plurality of points; generating a first plurality of patches based on the first plurality of points; generating a second plurality of patches based on the second plurality of points; packing the first plurality of patches and the second plurality of patches into an image; and generating the video stream based on the image.

20 Claims, 12 Drawing Sheets

(56) References Cited

U.S. PATENT DOCUMENTS

| | | | |
|---|---|---|---|
| 11,704,837 B2* | 7/2023 | Zhang | G06T 9/00 375/240.02 |
| 2008/0238919 A1* | 10/2008 | Pack | G06T 17/005 345/420 |
| 2013/0155058 A1 | 6/2013 | Golparvar-Fard et al. | |
| 2014/0254936 A1 | 9/2014 | Sun et al. | |
| 2016/0078663 A1 | 3/2016 | Sareen et al. | |
| 2016/0086353 A1 | 3/2016 | Lukac et al. | |
| 2018/0058861 A1* | 3/2018 | Doria | G06T 17/05 |
| 2018/0061069 A1* | 3/2018 | Higaki | G06T 5/50 |
| 2019/0122393 A1* | 4/2019 | Sinharoy | G06T 9/001 |
| 2019/0139266 A1* | 5/2019 | Budagavi | G06T 17/00 |
| 2019/0156519 A1* | 5/2019 | Mammou | H04N 19/172 |
| 2019/0174160 A1 | 6/2019 | Hamon | |
| 2019/0313080 A1* | 10/2019 | Mitchell | H04N 19/103 |
| 2020/0005518 A1* | 1/2020 | Graziosi | G06T 15/04 |
| 2020/0043186 A1* | 2/2020 | Selviah | G06T 7/33 |
| 2020/0045348 A1* | 2/2020 | Boyce | H04N 21/42653 |
| 2020/0107028 A1* | 4/2020 | Vosoughi | G06T 7/11 |
| 2020/0153885 A1* | 5/2020 | Lee | G06T 19/006 |
| 2020/0154137 A1* | 5/2020 | Fleureau | H04N 19/186 |
| 2020/0175726 A1* | 6/2020 | Kuma | H04N 19/119 |
| 2020/0252657 A1* | 8/2020 | Lasserre | H04N 19/597 |
| 2020/0344493 A1* | 10/2020 | Fleureau | H04N 13/161 |
| 2020/0359053 A1* | 11/2020 | Yano | G06T 15/00 |
| 2021/0006806 A1* | 1/2021 | Schwarz | H04N 19/597 |
| 2021/0058633 A1* | 2/2021 | Pettersson | H04N 19/117 |
| 2021/0174559 A1* | 6/2021 | Nakagami | G06T 9/00 |
| 2021/0176496 A1* | 6/2021 | Chupeau | H04N 19/124 |
| 2021/0250600 A1* | 8/2021 | Kuma | H04N 19/172 |
| 2021/0385454 A1* | 12/2021 | Fleureau | H04N 19/124 |

OTHER PUBLICATIONS

Real-time Point Cloud Compression by Tim Galla and Reinhard Klein, Sep. 28-Oct. 2, 2015, pp. 5087-5092.*

Golla et al., "Real-time Point Cloud Compression", Grant agreement No. 323567 (Harvest4D) 2013-2016, 2015 IEEE/RSJ International Conference on Intelligent Robots and Systems (IROS), [retrieved on Feb. 27, 2020] https://cg.cs.uni-bonn.de/aigaion2root/attachments/GollaIROS2015_authorsversion.pdf (6 pages total).

International Search Report dated Mar. 25, 2020 in International Application No. PCT/US2020/012302.

Written Opinion of the International Searching Authority dated Mar. 25, 2020 in International Application No. PCT/US2020/012302.

Shao et al., "PCC TMC13 CE13.2 report on point cloud tile and slice based coding", International Organisation for Standardisation Organisation Internationale De Normalisation ISO/IEC JTC1/SC29/WG11 Coding of Moving Pictures and Audio, ISO/IEC JTC1/SC29/WG11 MPEG2018/m43528, Jul. 2018, Ljubljana, SI (5 pages total).

3DG, "Algorithm description of mpeg-pcc-tmc2", International Organisation for Standardisation Organisation Internationale De Normalisation ISO/IEC JTC1/SC29/WG11 Coding of Moving Pictures and Audio, ISO/IEC JTC1/SC29/WG11 MPEG2018/N17526, Apr. 2018, San Diego, US (13 pages total).

3DG, "Description of PCC Core Experiment 2.19 on tiles and slices", International Organisation for Standardisation Organisation Internationale De Normalisation ISO/I EC JTC1/SC29/WG11 Coding of Moving Pictures and Audio, ISO/I EC JTC1/SC29/WG11 MPEG2018/N17873, Jan. 2018, Ljubljana, Slovenia (6 pages total).

Vosoughi et al., "[V-PCC] CE2.19-Related: Content-Aware Point Cloud Compression using HE VC Tiles", International Organisation for Standardisation Organisation Internationale De Normalisation ISO/IEC JTC1/SC29/WG11 Coding of Moving Pictures and Audio, ISO/IEC JTC1/SC29/WG11 MPEG2018/ m45016, Oct. 2018, Macao, China (5 pages total).

Extended European Search Report dated Feb. 2, 2022 from the European Patent Office in EP Application No. 20738438.9.

Communication dated Feb. 22, 2022 from the European Patent Office in EP Application No. 20738438.9.

Shao, Y., et al., "Description of Core Experiment 13.2 for PCC TMC13 on Category 1 and Category 3: Tile and/or Slice based Coding of Point Cloud Data", International Organisation for Stadardisation Organisation Internationale De Normalisation ISO/IEC JTC1/SC29/WG11 Coding of Moving Pictures and Audio, ISO/IEC JTC1/SC29/WG11, N17615, Apr. 2018, San Diego, USA, (4 Pages total).

Park, J.-.T., et al., "Non-overlapping Patch Packing in TMC2 with HEVC-SCC", International Organisation for Standardisation Organisation Internationale De Normalisation ISO/IEC JTC1/SC29/WG11 Coding of Moving Pictures and Audio, ISO/IEC JTC1/SC29/WG11 MPEG2016/M43288, Jul. 2018, Ljubljana, SI, (6 Pages total).

* cited by examiner

356

352

METHOD AND APPARATUS FOR POINT CLOUD CHUNKING FOR IMPROVED PATCH PACKING AND CODING EFFICIENCY

CROSS-REFERENCE TO RELATED APPLICATION

This application claims priority from U.S. Provisional Application No. 62/790,448, filed on Jan. 9, 2019, the disclosure of which is incorporated herein by reference in its entirety.

FIELD

This disclosure is directed to a set of advanced video coding technologies, more specifically, video based point cloud compression.

BACKGROUND

Advanced three-dimensional (3D) representations of the world are enabling more immersive forms of interaction and communication. They also allow machines to understand, interpret, and navigate our world. Point clouds have been widely used as a 3D representation of the world. Several use cases associated with point cloud data have been identified, and some corresponding requirements for point cloud representation and compression have been developed.

A point cloud may be a set of points in a 3D space, each with associated attributes, e.g. color, material properties, etc. Point clouds can be used to reconstruct an object or a scene as a composition of such points. They can be captured using multiple cameras and depth sensors in various setups and may be made up of thousands up to billions of points in order to realistically represent reconstructed scenes.

Compression technologies are needed to reduce the amount of data required to represent a point cloud. As such, technologies may be needed for lossy compression of point clouds for use in real-time communications and six Degrees of Freedom (DoF) virtual reality. In addition, technology is sought for lossless point cloud compression in the context of dynamic mapping for autonomous driving and cultural heritage applications, etc. MPEG has started working on a standard to address compression of geometry and attributes such as colors and reflectance, scalable/progressive coding, coding of sequences of point clouds captured over time, and random access to subsets of the point cloud.

SUMMARY

According to an embodiment, a method of encoding a video stream using video point cloud coding is performed by at least one processor and includes obtaining an input point cloud; dividing the input point cloud into a plurality of chunks, including a first chunk including a first plurality of points and a second chunk including a second plurality of points; generating a first plurality of patches based on the first plurality of points; generating a second plurality of patches based on the second plurality of points; packing the first plurality of patches and the second plurality of patches into an image; and generating the video stream based on the image.

According to an embodiment, an apparatus for encoding a video stream using video point cloud coding includes at least one memory configured to store program code; and at least one processor configured to read the program code and operate as instructed by the program code, the program code including obtaining code configured to cause the at least one processor to obtain an input point cloud; dividing code configured to cause the at least one processor to the input point cloud into a plurality of chunks, including a first chunk including a first plurality of points and a second chunk including a second plurality of points; first generating code configured to cause the at least one processor to generate a first plurality of patches based on the first plurality of points; second generating code configured to cause the at least one processor to generate a second plurality of patches based on the second plurality of points; packing code configured to cause the at least one processor to pack the first plurality of patches and the second plurality of patches into an image; and third generating code configured to cause the at least one processor to generate the video stream based on the image.

According to an embodiment, a non-transitory computer-readable medium stores computer instructions for encoding a video stream using video point cloud coding that, when executed by at least one processor, cause the at least one processor to: obtain an input point cloud; divide the input point cloud into a plurality of chunks, including a first chunk including a first plurality of points and a second chunk including a second plurality of points; generate a first plurality of patches based on the first plurality of points; generate a second plurality of patches based on the second plurality of points; pack the first plurality of patches and the second plurality of patches into an image; and generate the video stream based on the image.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

A consideration behind video-based point cloud compression (V-PCC) is to leverage existing video codecs to compress the geometry, occupancy, and texture of a dynamic point cloud as three separate video sequences. The extra metadata needed to interpret the three video sequences may be compressed separately. A small portion of the overall bitstream is the metadata, which could be encoded/decoded efficiently using software implementation. The bulk of the information may be handled by the video codec.

With reference to FIGS. 1-4, an embodiment of the present disclosure for implementing encoding and decoding structures of the present disclosure are described. The encoding and decoding structures of the present disclosure may implement aspects of V-PCC described above.

Figure 1:
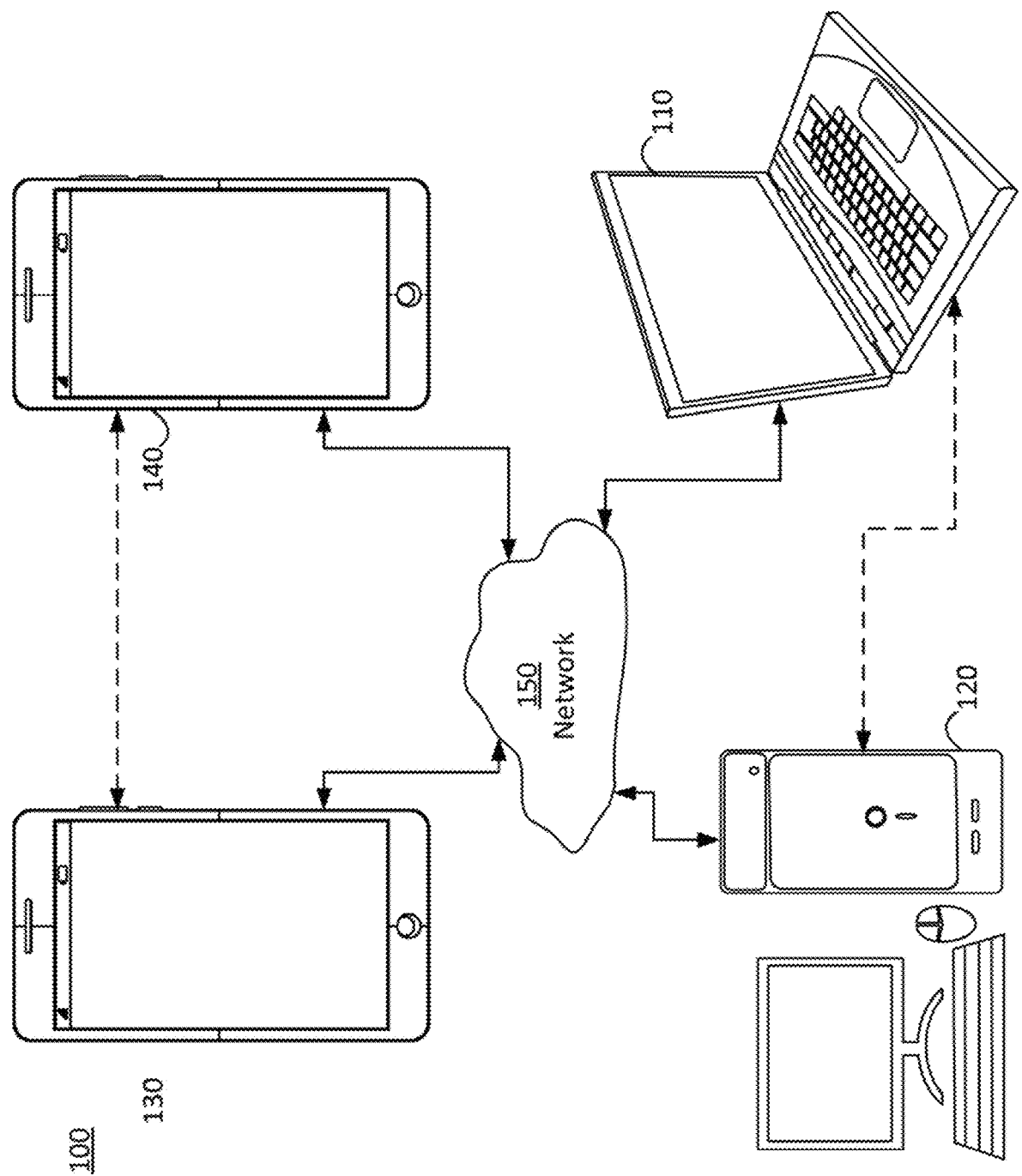
FIG. 1 is a schematic illustration of a simplified block diagram of a communication system in accordance with an embodiment.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminal. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
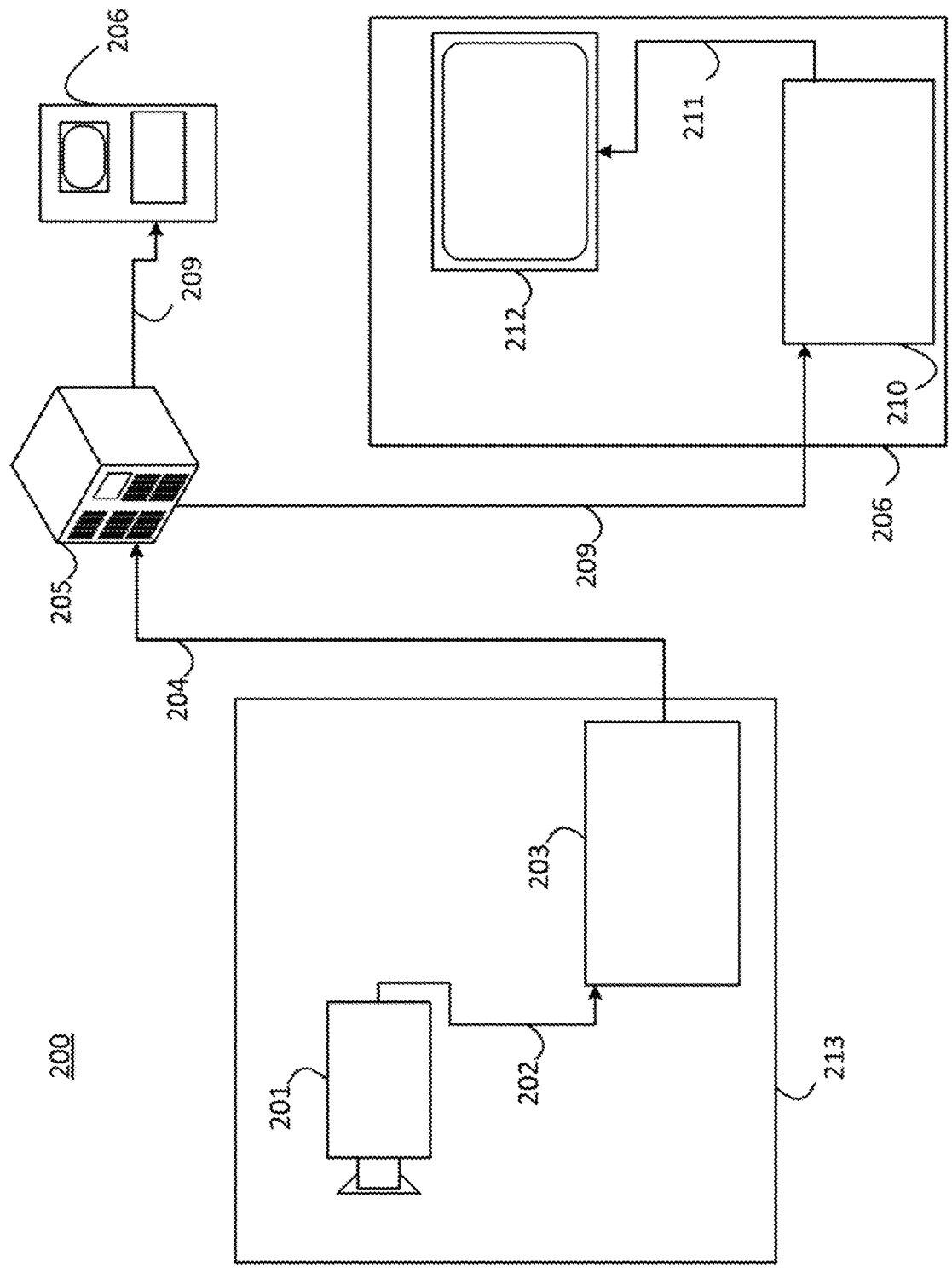
FIG. 2 is a schematic illustration of a simplified block diagram of a streaming system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D point cloud corresponding to a 3D video. The video source 201 may include, for example, 3D sensors (e.g. depth sensors) or 3D imaging technology (e.g. digital camera(s)), and a computing device that is configured to generate the 3D point cloud using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265, Versatile Video Coding (VVC), and MPEG/V-PCC.

Figure 3:
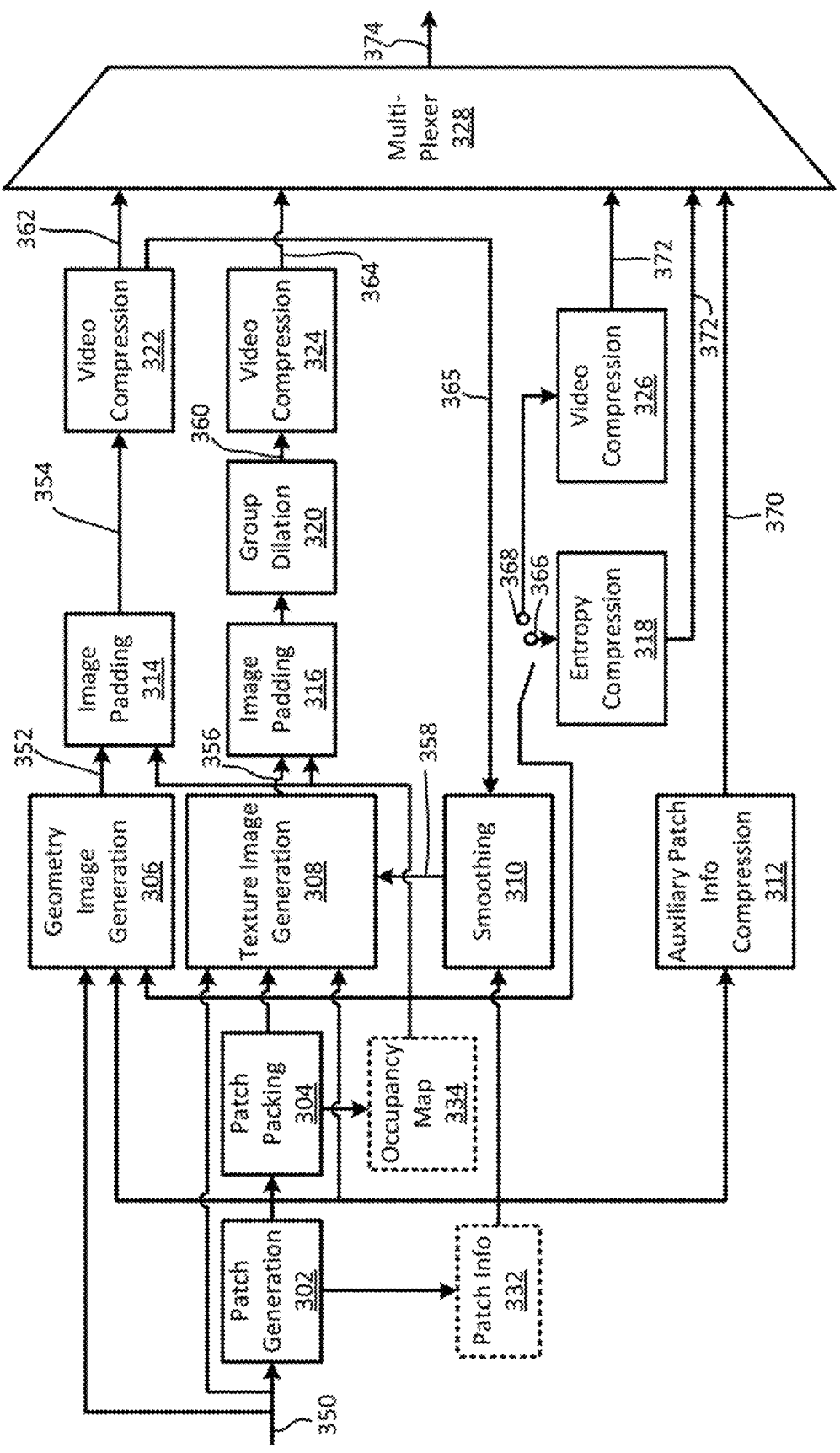
FIG. 3 is a schematic illustration of a simplified block diagram of a video encoder in accordance with an embodiment.
Figure 4:
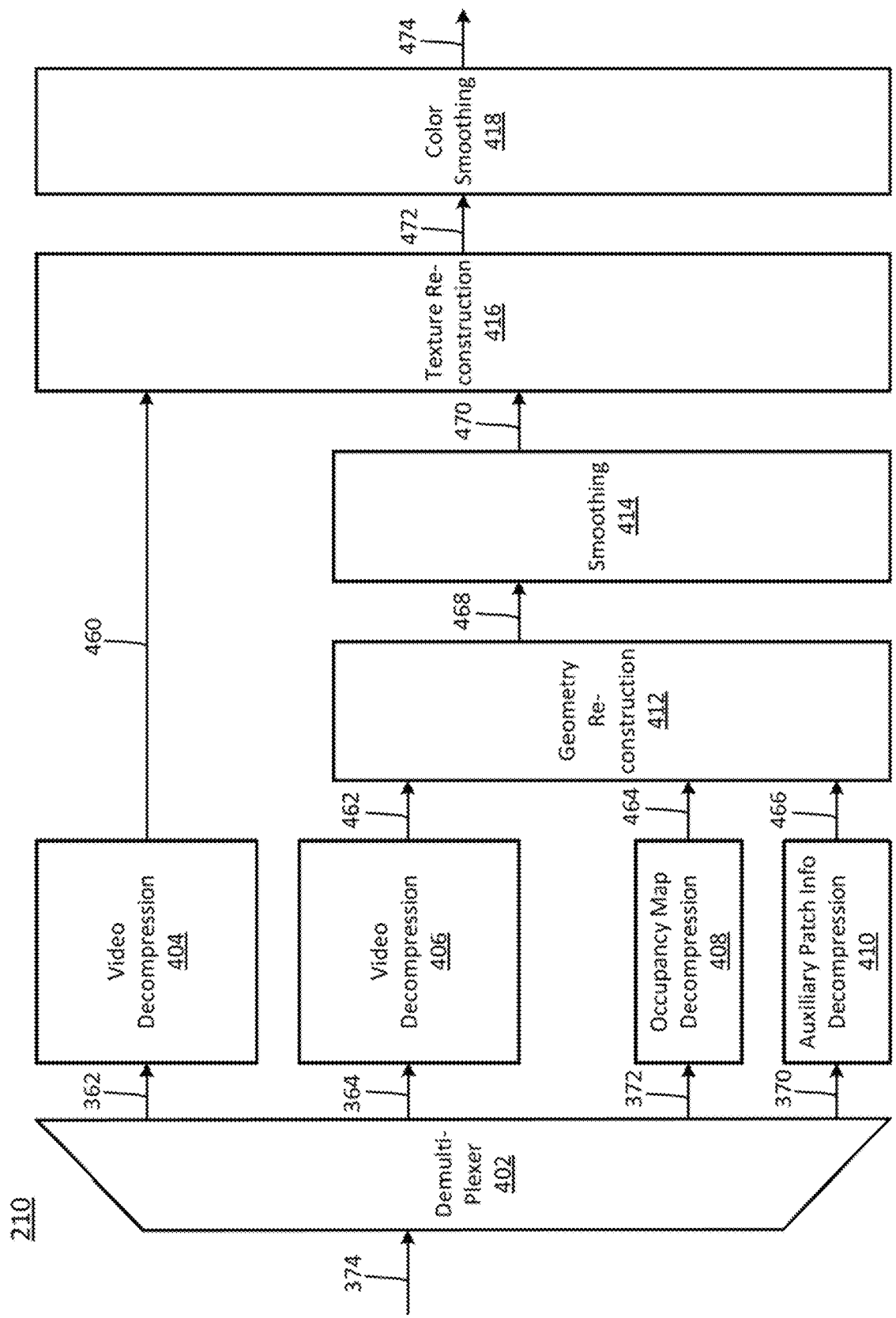
FIG. 4 is a schematic illustration of a simplified block diagram of a video decoder in accordance with an embodiment.

With reference to FIGS. 3-4, some aspects of V-PCC that may be performed by embodiments of the present disclosure are described below.

FIG. 3 illustrates an example functional block diagram of a video encoder 203 according to an embodiment of the present disclosure.

As illustrated in FIG. 3, the video encoder 203 may receive a point cloud frame(s) 350, and generate a geometry image 352, a texture image 356, and an occupancy map 334 based on the point cloud frame 350. The video encoder 203 may compress the geometry image 352 into a compressed geometry image 362, the texture image 356 into a compressed texture image 364, and the occupancy map 334 into a compressed occupancy map 372. A multiplexer 328 of the video encoder 203 may form a compressed bitstream 374 that includes the compressed geometry image 362, the compressed texture image 364, and the compressed occupancy map 372.

More specifically, in embodiments, the video encoder 203 may include a patch generation module 302 that segments the point cloud frame 350 into patches. Patches are useful entities of V-PCC. The patch generation process includes decomposing the point cloud frame 350 into a minimum number of patches with smooth boundaries, while also minimizing the reconstruction error. Encoders of the present disclosure may implement various methods to generate such a decomposition.

The video encoder 203 may include a patch packing module 304 that performs a packing process. The packing process includes mapping the extracted patches onto a 2D grid while minimizing the unused space and guaranteeing that every M×M (e.g., 16×16) block of the grid is associated with a unique patch. Efficient patch packing directly impacts the compression efficiency either by minimizing the unused space or ensuring temporal consistency. The patch packing module 304 may generate the occupancy map 334.

The video encoder 203 may include a geometry image generation module 306 and a texture image generation module 308. In order to better handle the case of multiple points being projected to the same sample, each patch may be projected onto two images, referred to as layers. For example, the geometry image generation module 306 and the texture image generation module 308 may exploit the 3D to 2D mapping computed during the packing process of the patch packing module 304 to store the geometry and texture of the point cloud as images (a.k.a. layers). The generated images/layers may be stored as a video frame(s) and compressed using a video codec (e.g. HM video codec) according to configurations provided as parameters.

Figure 6:
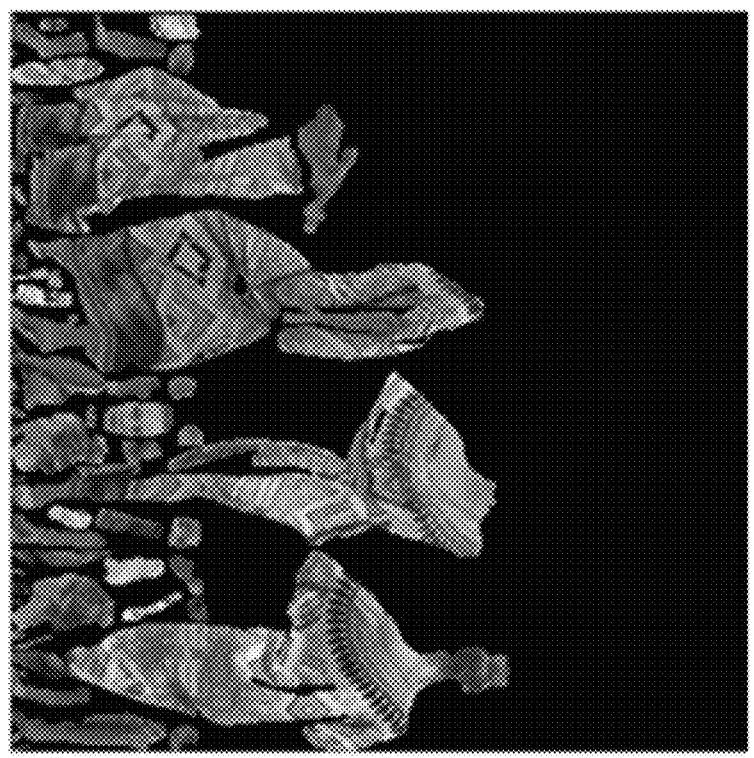
FIG. 6 illustrates an example of a texture image in accordance with an embodiment.
Figure 5:
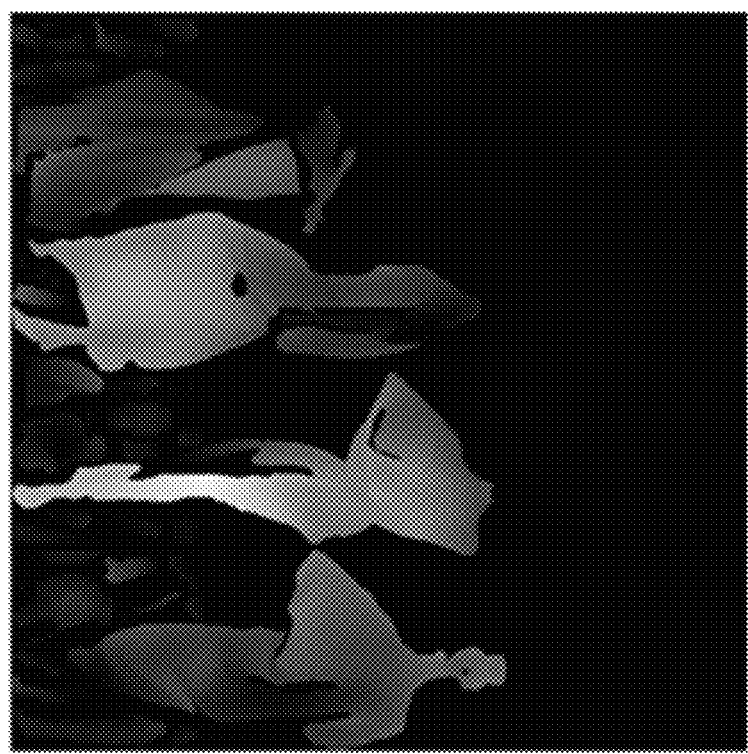
FIG. 5 illustrates an example of a geometry image in accordance with an embodiment.

In embodiments, the geometry image generation module 306 generates the geometry image 352 and the texture image generation module 308 generates the texture image 356, based on the input point cloud frame 350 and the occupancy map 334. An example of the geometry image 352 is illustrated in FIG. 5 and an example of the texture image 356 is illustrated in FIG. 6. In an embodiment, the geometry image 352 may be represented by a monochromatic frame of W×H in YUV420-8 bit format. In an embodiment, the occupancy map 334 image consists of a binary map that indicates for each cell of the grid whether it belongs to the empty space or to the point cloud. To generate the texture image 356, the texture image generation module 308 may exploit the reconstructed/smoothed geometry 358 in order to compute the colors to be associated with the re-sampled points.

The video encoder 203 may also include an image padding module 314 and an image padding module 316 for padding the geometry image 352 and the texture image 356, respectively, to form a padded geometry image 354 and a padded texture image 360. The image padding (a.k.a. background filling) simply fills unused space of the images with redundant information. A good background filling is a one that minimally increases the bit rate while does not introduce significant coding distortion around the patch boundaries. The image padding module 314 and the image padding module 316 may use the occupancy map 334 to form the padded geometry image 354 and the padded texture image 360, respectively. In an embodiment, the video encoder 203 may include a group dilation module 320 to form the padded texture image 360. Group dilation module 320 may be used, for example, to ensure spatial consistency between patches of various frames.

The video encoder 203 may include a video compression module 322 and a video compression module 324 for compressing the padded geometry image 354 and the padded texture image 360 into the compressed geometry image 362 and the compressed texture image 364, respectively.

The video encoder 203 may include an entropy compression module 318 for lossless encoding 366 of the occupancy map 334 and a video compression module 326 for lossy encoding 368 of the occupancy map 334. The state of the switch between lossless encoding 366 and lossy encoding 368 may be determined based on, for example, a bitrate of an incoming point cloud 350 or a bitrate of bitstream 374.

In embodiments, the video encoder 203 may include a smoothing module 310 for generating smoothed geometry 358 by using a reconstructed geometry image 365, provided by the video compression module 322, and patch info 332. The smoothing procedure of the smoothing module 310 may aim at alleviating potential discontinuities that may arise at the patch boundaries due to compression artifacts. The smoothed geometry 358 may be used by the texture image generation module 308 to generate the texture image 356.

The video encoder 203 may also include an auxiliary patch information compression module 312 for forming compressed auxiliary patch information 370 that is provided in the compressed bitstream 374 by the multiplexer 328.

FIG. 4 illustrates an example functional block diagram of a video decoder 210 according to an embodiment of the present disclosure.

As illustrated in FIG. 4, the video decoder 210 may receive the coded bitstream 374 from the video encoder 203 to obtain the compressed texture image 362, the compressed geometry image 364, the compressed occupancy map 372, and the compressed auxiliary patch information 370. The video decoder 210 may decode the compressed texture image 362, the compressed geometry image 364, the compressed occupancy map 372, and the compressed auxiliary patch information 370 to obtain a decompressed texture image 460, a decompressed geometry image 462, a decompressed occupancy map 464, and decompressed auxiliary patch information 466, respectively. Following, the video decoder 210 may generate a reconstructed point cloud 474 based on the decompressed texture image 460, the decompressed geometry image 462, the decompressed occupancy map 464, and the decompressed auxiliary patch information 466.

In embodiments, the video decoder 210 may include a demultiplexer 402 that separates the compressed texture image 362, the compressed geometry image 364, the compressed occupancy map 372, and the compressed auxiliary patch information 370 of the compressed bitstream 374 received.

The video decoder 210 may include a video decompression module 404, a video decompression module 406, an occupancy map decompression module 408, and an auxiliary patch information decompression module 410 that decode the compressed texture image 362, the compressed geometry image 364, the compressed occupancy map 372, and the compressed auxiliary patch information 370, respectively.

The video decoder 210 may include a geometry reconstruction module 412 that obtains reconstructed (three dimensional) geometry 468 based on the decompressed geometry image 462, the decompressed occupancy map 464, and the decompressed auxiliary patch information 466.

The video decoder 210 may include a smoothing module 414 that smoothes the reconstructed geometry 468 to obtain smoothed geometry 470. The smoothing procedure may aim at alleviating potential discontinuities that may arise at the patch boundaries due to compression artifacts.

The video decoder 210 may include a texture reconstruction module 416 for obtaining reconstructed texture 472 based on the decompressed texture image 460 and the smoothed geometry 470.

The video decoder 210 may include a color smoothing module 418 that smoothes the color of the reconstructed texture 472 to obtain a reconstructed point cloud 474. Non-neighboring patches in 3D space are often packed next to each other in 2D videos. This implies that pixel values from non-neighboring patches might be mixed up by the block-based video codec. The color smoothing of the color smoothing module 418 may aim to reduce the visible artifacts that appear at patch boundaries.

As discussed above, a packing process may include mapping the extracted patches onto a 2D grid while minimizing the unused space and guaranteeing that every M×M (e.g., 16×16) block of the grid is associated with a unique patch. In an embodiment, V-PCC may use a simple packing strategy that iteratively tries to insert patches into a W×H grid. W and H may be user defined parameters, which may correspond to the resolution of the geometry/texture/motion video images that will be encoded. The patch location may be determined through an exhaustive search that is applied in raster scan order. The first location that can guarantee an overlapping-free insertion of the patch may be selected and the grid cells covered by the patch may be marked as used.

Figure 7:
FIG. 7 illustrates an example of a packing in accordance with an embodiment.
Figure 8B:
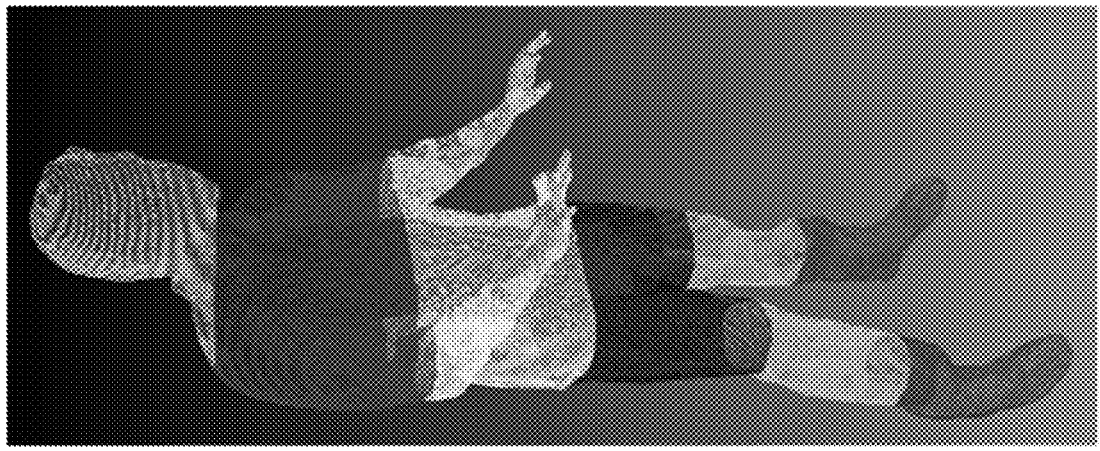
FIGS. 8A-8B illustrate examples of packings in accordance with embodiments.
Figure 8A:
Figure 9B:
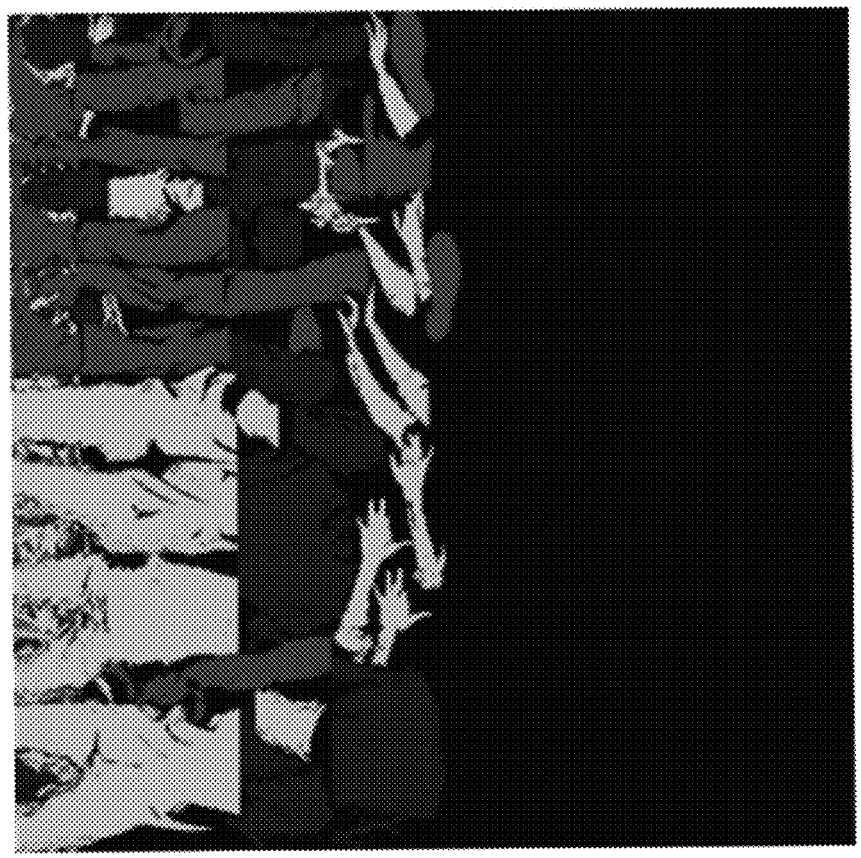
FIGS. 9A-9D illustrate examples of packings in accordance with embodiments.
Figure 9A:
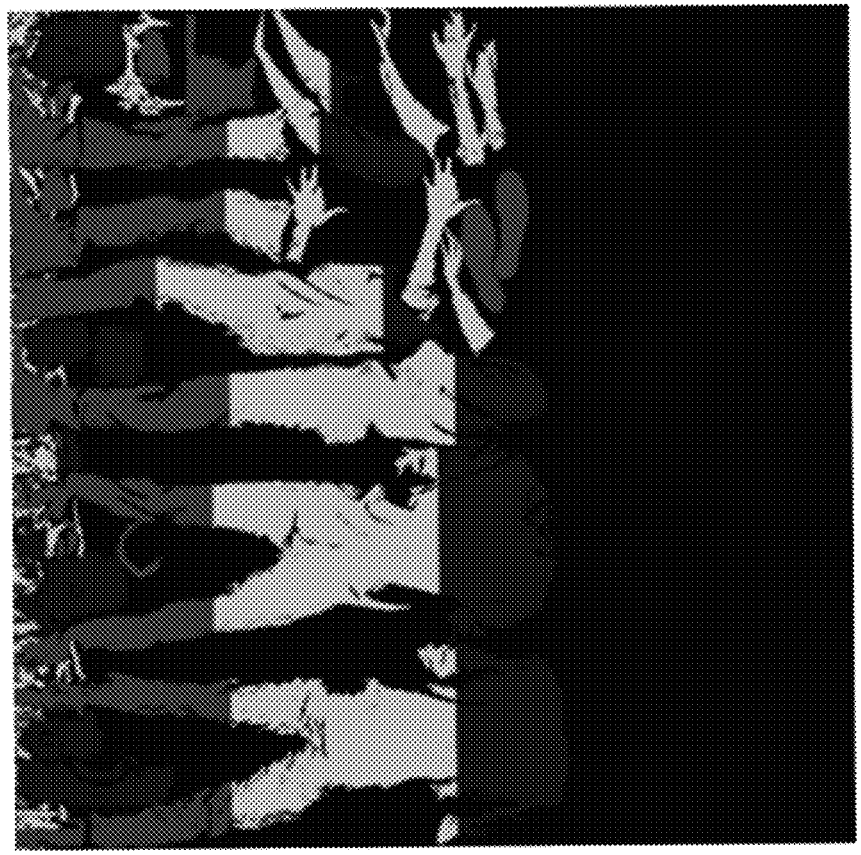
Figure 9D:
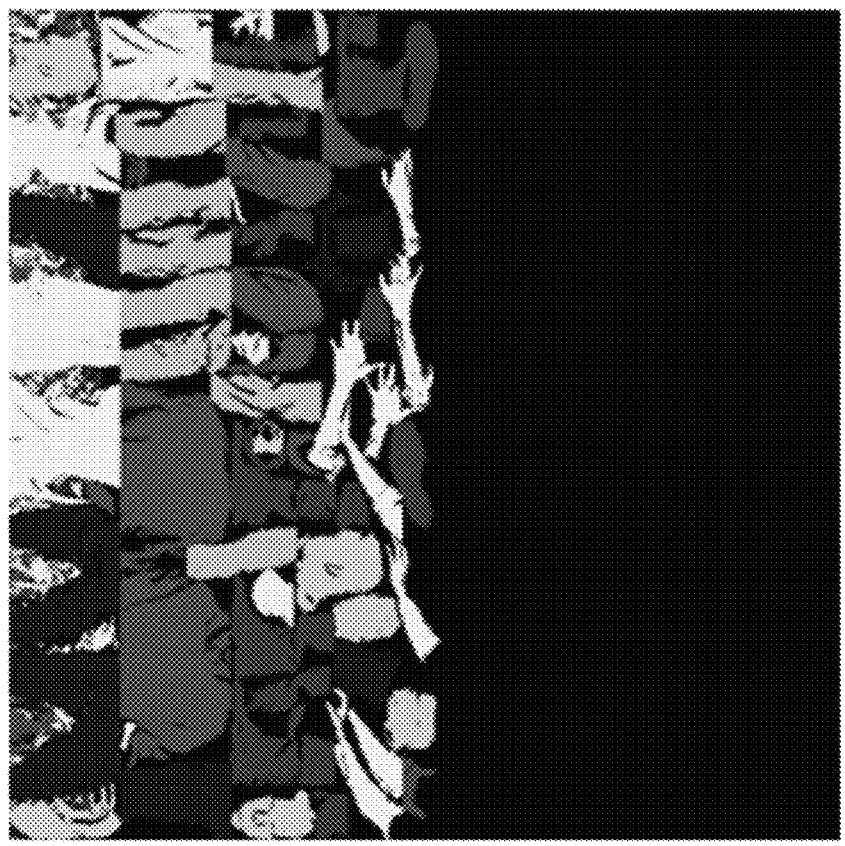
Figure 9C:
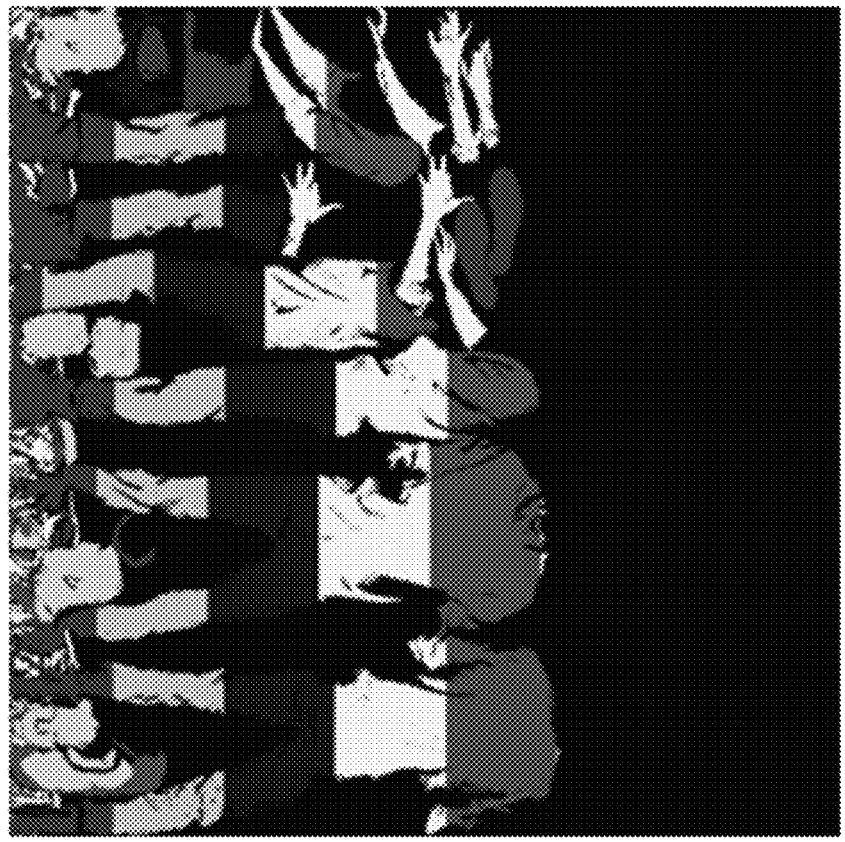

If no empty space in the current resolution image can fit a patch, then the height H of the grid may be temporarily doubled, and search may be applied again. At the end of the process, H may be clipped to fit the used grid cells. For a video sequence, a process that determines W and H for the entire GOP may be used. An example of a result of such a packing process is illustrated in FIG. 7.

Examples of proposed algorithms, according to various embodiments, may include Algorithms #1-#6 discussed below:

Algorithm #1:

According to a first algorithm, chunking may be performed only along one axis. First, the bounding box of the input point cloud may be found. Then, the eigen vectors of the covariance matrix of the points may found. Then, chunking may be performed along the axis which is closest to the eigen vector corresponding to the largest eigen value.

In an embodiment, $\Phi = \{\phi_1, \phi_2, \phi_3\}$ may denote the set of eigen vectors and $\Lambda = \{\lambda_1, \lambda_2, \lambda_3\}$ may the set of corresponding eigen values sorted in descending order, i.e., $\lambda_1 > \lambda_2 > \lambda_3$. The unit vectors of the input cloud may be denoted by x=(1, 0, 0), y=(0, 1, 0), z=(0, 0, 1). Chunking may be performed done along the axis v* whose inner product with $\phi_1$ has the largest absolute value, as shown in Equation 1 below:

$$v^* = \arg\max_{v \in \{x,y,z\}} |v \cdot \phi_1| \quad \text{(Equation 1)}$$

Eigen vectors $\Phi = \{\phi_1, \phi_2, \phi_3\}$ may be computed as follows. First, the covariance matrix of the input cloud with N points may be estimated using Equation 2 below:

$$C = \frac{\sum_{i=1}^{N}(p_i - \bar{p})(p_i - \bar{p})^T}{N} \quad \text{(Equation 2)}$$

where $\bar{p}$ may denote the centroid of the point cloud and may be calculated by Equation 3 below:

$$\bar{p} = \frac{\sum_{i=1}^{N} p_i}{N} \quad \text{(Equation 3)}$$

$a^T$ may denote the transpose of vector a.

The SVD decomposition of C may be used to find the eigen vector and eigen values as below in Equation 4:

$$C = [\phi_1, \phi_2, \phi_3] \begin{bmatrix} \lambda_1 & 0 & 0 \\ 0 & \lambda_2 & 0 \\ 0 & 0 & \lambda_3 \end{bmatrix} [\phi_1^T, \phi_2^T, \phi_3^T] \quad \text{(Equation 4)}$$

Algorithm #2:

According to a second algorithm, chunking may be performed only along one axis. First, the bounding box of the cloud may be found. Then, the longest (or shortest) axis of the bounding box may be found, and chunking may be performed along that axis.

Algorithm #3:

According to a third algorithm, once a chunking axis is specified, chunking along that axis could be done uniformly or non-uniformly. Examples of non-uniform chunking may include chunking so that all chunks have equal number of points, or chunking so that the densities of chunks are (approximately) equal, where density may be defined as the number of points belonging to a chunk divided by the bounding box volume of that chunk.

Algorithm #4:

According to a fourth algorithm, chunking may be performed along 2 or 3 axes. For example, an objective function, like the average of the chunk densities, may be chosen. Then, a set of feasible chunking configurations may be defined by chunking along 2 or 3 axes. The objective function may be minimized by doing an exhaustive search over that set.

Algorithm #5:

According to a fifth algorithm, chunking may be performed along 2 or 3 axes. First, the bounding box of the input point cloud may be found. Then, the eigen vectors of the covariance matrix of the points may be found. Then, chunking may be performed along the axis $v_1^*$ which is closest to the eigen vector $\phi_1$ (see Algorithm #1 for notation) according to Equation 5 below:

$$v_1^* = \arg\max_{v \in \{x,y,z\}} |v \cdot \phi_1| \quad \text{(Equation 5)}$$

Then, chunking may be performed along the axis $v_2^*$ which is closest to the eigen vector $\phi_2$ according to Equation 6 below:

$$v_2^* = \arg\max_{v \in \{x,y,z\} \setminus v_1^*} |v \cdot \phi_2| \quad \text{(Equation 6)}$$

where A\b denotes the set obtained by removing b from the set A.

Algorithm #6:

According to a sixth algorithm, segmentation may be used to segment the input cloud into several cloud segments. One example may include the use of off-the-shelf human body segmentation algorithms for the case where the input cloud is a human body. Each segmented body part may be regarded as a chunk which undergoes the patch generation process independently of the body parts. Clustering techniques could also be used for segmentation of the points. Examples include, but are not restricted to K-means clustering, hierarchical clustering, Gaussian mixtures, and spectral clustering.

Although several algorithms have been described above, the present disclosure is not limited to the described algorithms. In addition, the present disclosure contemplates that the described algorithms may be altered or combined in any desired manner.

In an embodiment, an encoder may decide not to signal any information regarding the chunking configuration adopted, and the decoder may still able to decode the cloud reconstructed at the encoder.

In an embodiment, an encoder may decide to signal the chunking configuration. Knowing the chunking boundaries, encoder can perform additional geometry smoothing (or any other kind of signal processing) at the boundaries of chunks. Since smoothing is done both at the encoder and decoder, the decoder may need to know the chunking configuration.

An example of a metadata syntax for signaling the embodiments discussed above is shown in Table 1 below:

TABLE 1

| | Descriptor |
|---|---|
| cloud_chunking_with_signaling_metadata( ) { | |
|   if(cloud_chunking_with_signaling_enabled_flag) { | |
|     cloud_chunking_with_signaling_present_flag | u(1) |
|     number_of_chunks | ui(32) |
|     if(cloud_chunking_with_signaling_present_flag) { | |
|       for(i = 0; i < number_of_chunks; ++i) { | |
|         for(axis = 0; axis < 3; ++axis) { | |
|           chunk_bounding_box_origin[i][axis] | ui(32) |
|           chunk_bounding_box_size[i][axis] | ui(32) |
|         } | |
|       } | |
|     } | |
|   } | |
| } | |

In Table 1 above, cloud_chunking_with_signaling_present flag may indicate whether cloud chunking with signaling is used or not.

number of chunks may indicate the number of chunks. The value of number of chunks may be in the range [1, 255].

chunk_bounding_box_origin[i][axis] may indicate the origin of the bounding box of the i-th chunk along the axis with index "axis". Values of axis index may be 0, 1, and 2, which may respectively correspond to axes x, y, and z. The value of chunk_bounding_box_origin[i][axis] may be in the range $[1, 2^{32}]$.

chunk_bounding_box_size[i][axis] may indicate the size of the bounding box of the i-th chunk along the axis with index "axis". Values of axis index may be 0, 1, and 2, which respectively correspond to axes x, y, and z. The value of chunk_bounding_box_size[i][axis] may be in the range $[1, 2^{32}]$.

An example decoding process may take as inputs the origins and sizes of the bounding boxes of the chunks. If it is desired that an encoder or decoder perform additional processing, for example additional smoothing, etc., at the neighborhood of the chunk boundaries, a decoder, for example decoder 210, may decode the origins and sizes of all the chunks' bounding boxes. Once the origin of a bounding box and its size along all the axes x, y, and z are determined, the chunk boundaries may be easily derived and could be used for further processing.

Figure 10:
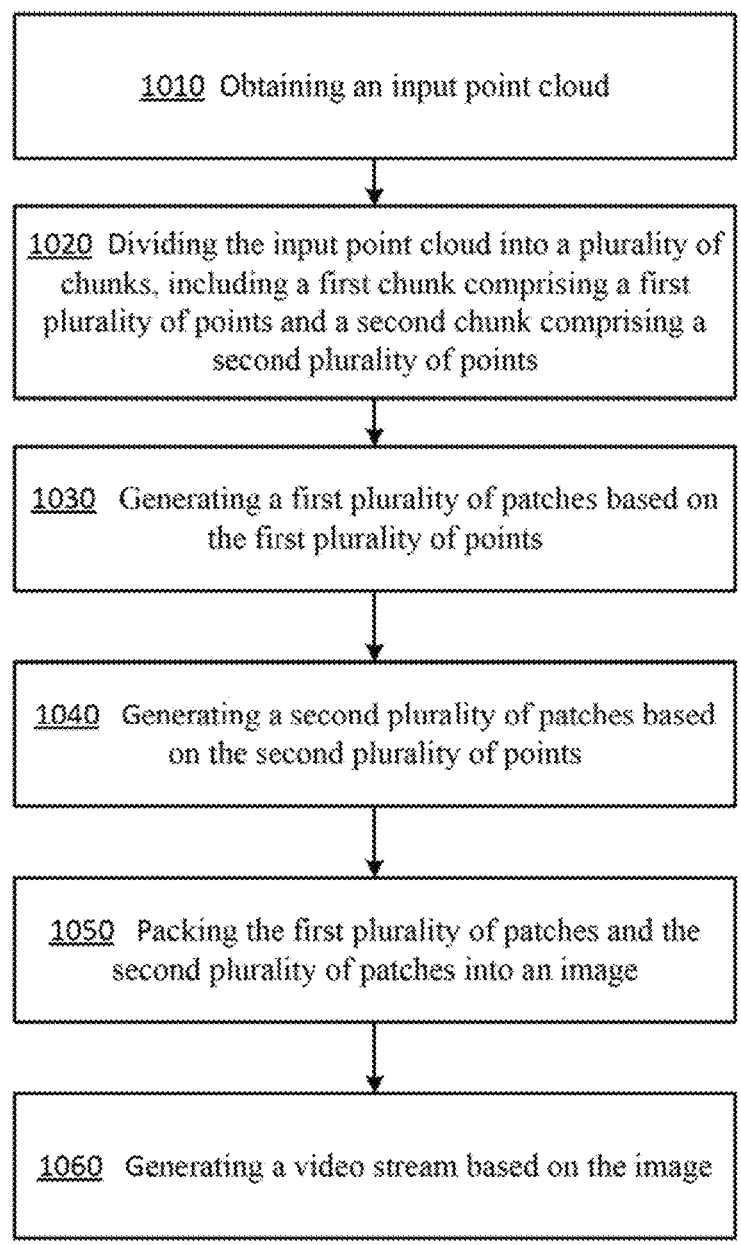
FIG. 10 is a flow diagram illustrating a process performed by an embodiment.

FIG. 10 is a flowchart of a method 1000 of encoding a video stream using video point cloud coding, according to embodiments. In some implementations, one or more process blocks of FIG. 10 may be performed by encoder 203. In some implementations, one or more process blocks of FIG. 10 may be performed by another device or a group of devices separate from or including the encoder 203, such as the decoder 210.

As shown in FIG. 10, in operation 1010, the method 1000 may include obtaining an input point cloud.

As shown in FIG. 10, in operation 1020, the method 1000 may include dividing the input point cloud into a plurality of chunks, including a first chunk including a first plurality of points and a second chunk including a second plurality of points.

As shown in FIG. 10, in operation 1030, the method 1000 may include generating a first plurality of patches based on the first plurality of points.

As shown in FIG. 10, in operation 1040, the method 1000 may include generating a second plurality of patches based on the second plurality of points.

As shown in FIG. 10, in operation 1050, the method 1000 may include packing the first plurality of patches and the second plurality of patches into an image.

As shown in FIG. 10, in operation 1060, the method 1000 may include generating a video stream based on the image.

In an embodiment, the method 1000 may include obtaining a plurality of missed points which are included in the input point cloud and are not included in the first plurality of points and the second plurality of points, and generating the video stream based on the image and the plurality of missed points.

In an embodiment, the method 1000 may include determining a bounding box of the input point cloud; determining one or more axes of the bounding box; and dividing the input point cloud into the plurality of chunks based on the one or more axes.

In an embodiment, the plurality of chunks may be aligned along one from among a longest axis of the one or more axes, or a shortest axis of the one or more axes.

In an embodiment, the method 1000 may include determining eigen vectors of a covariance matrix of the input point cloud; selecting an eigen vector from among the eigen vectors, wherein the eigen vector corresponds to a largest eigen value from among eigen values corresponding to the eigen vectors; selecting an axis, wherein the axis is closest to the eigen vector from among the one or more axes; and dividing the input point cloud into the plurality of chunks along the axis.

In an embodiment, the plurality of chunks may be aligned along a first axis from among the one or more axes and a second axis from among the one or more axes.

In an embodiment, the method 1000 may include determining eigen vectors of a covariance matrix of the input point cloud; selecting a first eigen vector and a second eigen vector from among the eigen vectors, wherein the first axis is closest to the first eigen vector from among the one or more axes, and wherein the second axis is closes to the second eigen vector from among the one or more axes.

In an embodiment, a number of the first plurality of points may be equal to a number of the second plurality of points.

In an embodiment, the input point cloud may represent a human body; and the plurality of chunks may be selected based on a body part segmentation performed on the input point cloud.

In an embodiment, metadata of the video stream may indicate at least one from among an indication of whether chunking is used to encode the video stream, a number of the plurality of chunks, an origin point of a boundary box of the input point cloud, and a size of the boundary box.

Although FIG. 10 shows example blocks of the method 1000, in some implementations, the method 1000 may include additional blocks, fewer blocks, different blocks, or differently arranged blocks than those depicted in FIG. 10. Additionally, or alternatively, two or more of the blocks of the method 1000 may be performed in parallel.

Figure 11:
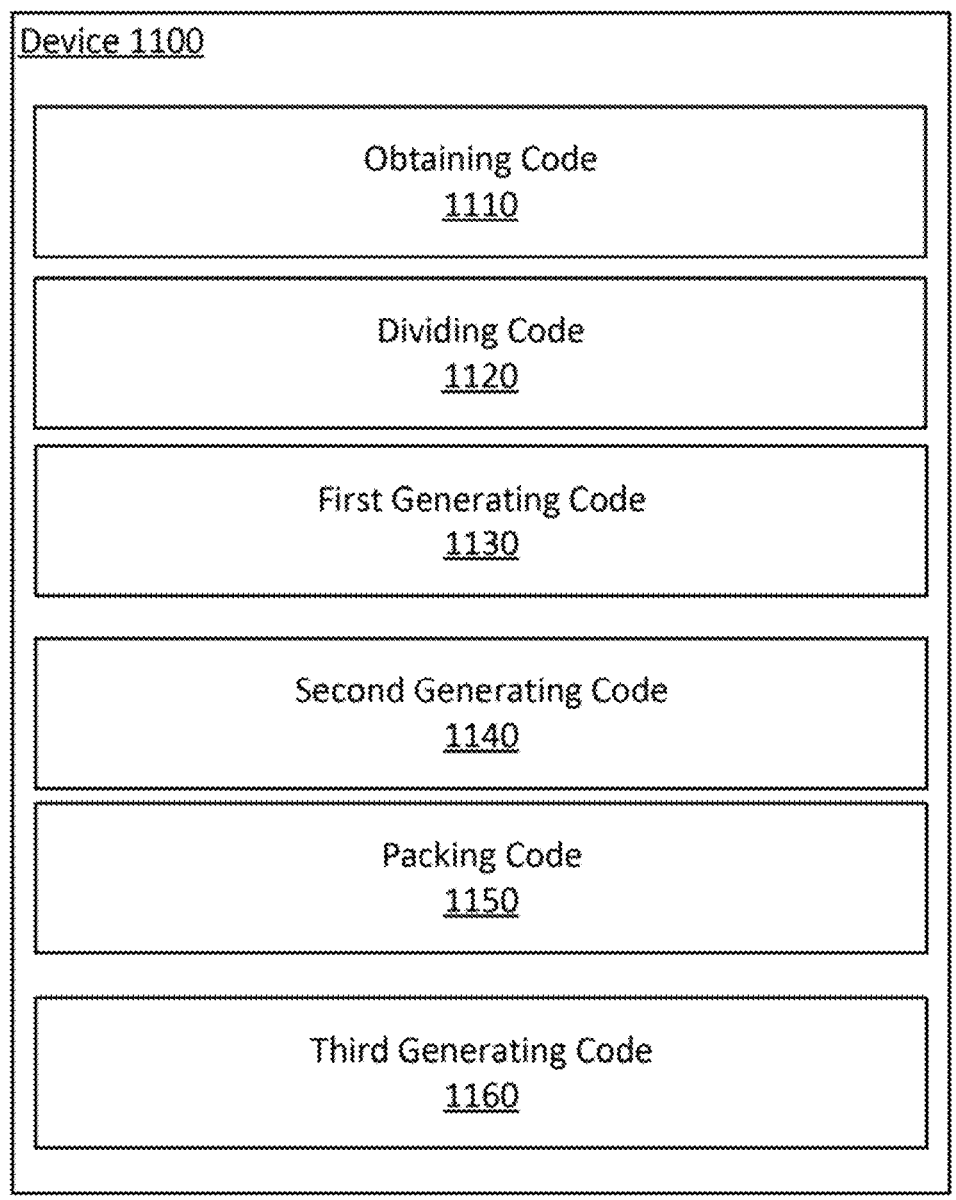
FIG. 11 is a diagram illustrating a device in accordance with an embodiment.

FIG. 11 is a diagram of an apparatus 1100 for encoding a video stream encoded using video point cloud coding, according to embodiments. As shown in FIG. 11, the apparatus 1100 includes obtaining code 1110, dividing code 1120, first generating code 1130, second generating code 1140, packing code 1150, and third generating code 1160.

The obtaining code 1110 may be configured to cause the at least one processor to obtain an input point cloud.

The dividing code 1120 may be configured to cause the at least one processor to the input point cloud into a plurality of chunks, including a first chunk including a first plurality of points and a second chunk including a second plurality of points.

The first generating code 1130 may be configured to cause the at least one processor to generate a first plurality of patches based on the first plurality of points.

The second generating code 1140 may be configured to cause the at least one processor to generate a second plurality of patches based on the second plurality of points.

The packing code 1150 may be configured to cause the at least one processor to pack the first plurality of patches and the second plurality of patches into an image.

The third generating code 1160 may be configured to cause the at least one processor to generate the video stream based on the image.

The techniques, described above, can be implemented as computer software using computer-readable instructions and physically stored in one or more computer-readable media. For example, FIG. 12 shows a computer system 1200 suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
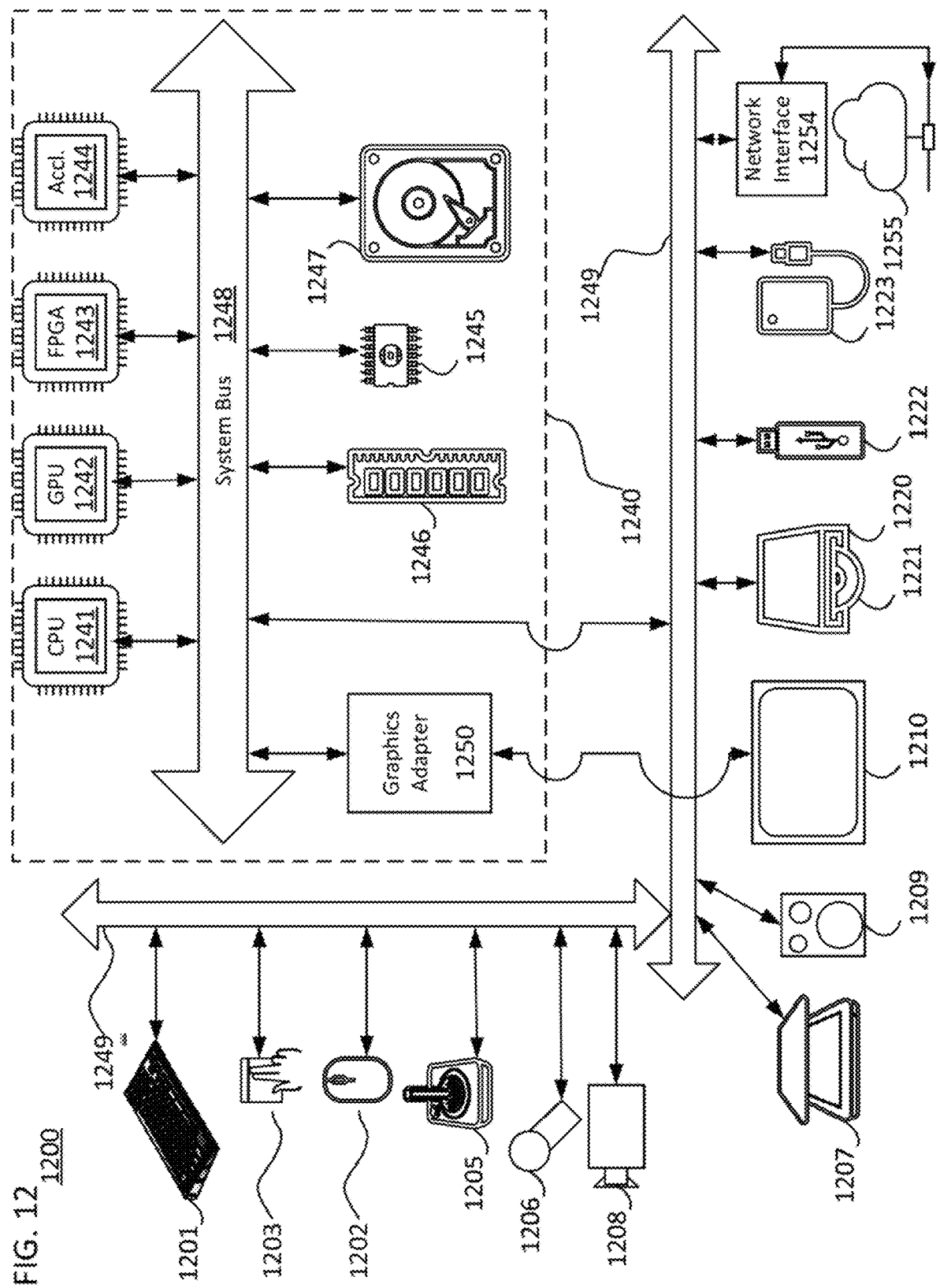
FIG. 12 is a diagram of a computer system suitable for implementing embodiments.

The components shown in FIG. 12 for computer system 1200 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1200.

Computer system 1200 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1201, mouse 1202, trackpad 1203, touch screen 1210, data-glove, joystick 1205, microphone 1206, scanner 1207, camera 1208.

Computer system 1200 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1210, data glove, or joystick 1205, but there can also be tactile feedback devices that do not serve as input devices). For example, such devices may be audio output devices (such as: speakers 1209, headphones (not depicted)), visual output devices (such as screens 1210 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 1200 can also include human accessible storage devices and their associated media such as optical media including CD/DVD ROM/RW 1220 with CD/DVD or the like media 1221, thumb-drive 1222, removable hard drive or solid state drive 1223, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1200 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1249 (such as, for example USB ports of the computer system 1200; others are commonly integrated into the core of the computer system 1200 by attachment to a system bus as described below (for example Ethernet interface into a PC computer system or cellular network interface into a smartphone computer system). Using any of these networks, computer system 1200 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 1255. Certain protocols and protocol stacks can be used on each of those networks and network interfaces as described above.

Aforementioned human interface devices, human-accessible storage devices, and network interfaces 1254 can be attached to a core 1240 of the computer system 1200.

The core 1240 can include one or more Central Processing Units (CPU) 1241, Graphics Processing Units (GPU) 1242, specialized programmable processing units in the form of Field Programmable Gate Areas (FPGA) 1243, hardware accelerators for certain tasks 1244, and so forth. These devices, along with Read-only memory (ROM) 1245, Random-access memory 1246, internal mass storage such as internal non-user accessible hard drives, SSDs, and the like 1247, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 1249. Architectures for a peripheral bus include PCI, USB, and the like. A graphics adapter 1250 may be included in the core 1240.

CPUs 1241, GPUs 1242, FPGAs 1243, and accelerators 1244 can execute certain instructions that, in combination, can make up the aforementioned computer code. That computer code can be stored in ROM 1245 or RAM 1246. Transitional data can be also be stored in RAM 1246, whereas permanent data can be stored for example, in the internal mass storage 1247. Fast storage and retrieve to any of the memory devices can be enabled through the use of cache memory, that can be closely associated with one or more CPU 1241, GPU 1242, mass storage 1247, ROM 1245, RAM 1246, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1200, and specifically the core 1240 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1240 that are of non-transitory nature, such as core-internal mass storage 1247 or ROM 1245. The software implementing various embodiments of the present disclosure can be stored in such devices and executed by core 1240. A computer-readable medium can include one or more memory devices or chips, according to particular needs. The software can cause the core 1240 and specifically the processors therein (including CPU, GPU, FPGA, and the like) to execute particular processes or particular parts of particular processes described herein, including defining data structures stored in RAM 1246 and modifying such data structures according to the processes defined by the software. In addition or as an alternative, the computer system can provide functionality as a result of logic hardwired or otherwise embodied in a circuit (for example: accelerator 1244), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claims is:

1. A method of encoding a video stream using video point cloud coding, the method being performed by at least one processor and comprising:
    obtaining an input point cloud;
    dividing the input point cloud into a plurality of chunks, including a first chunk comprising a first plurality of points and a second chunk comprising a second plurality of points, based on determining that the chunks are aligned with an axis of a bounding box of the input point cloud, the first plurality of points being a first sub-point cloud of the input point cloud, and the second plurality of points being a second sub-point cloud of the input point cloud;
    applying a patch generation process to the first chunk to generate a first plurality of patches based on the first plurality of points;
    applying the patch generation process separately to the second chunk to generate a second plurality of patches based on the second plurality of points, wherein the second plurality of patches is different from the first plurality of patches;
    packing the first plurality of patches and the second plurality of patches;
    generating at least one texture image based on the packed first plurality of patches and the packed second plurality of patches;
    generating at least one geometry image based on the packed first plurality of patches and the packed second plurality of patches; and
    generating the video stream based on the at least one texture image and the at least one geometry image,
    wherein dividing the input point cloud into the plurality of chunks comprises:
        determining eigen vectors, of at least $\Phi=\{\phi_1, \phi_2, \phi_3\}$, by estimating a covariance matrix of the input point cloud with N points according to at least $$C = \frac{\sum_{i=1}^{N}(p_i - \bar{p})(p_i - \bar{p})^T}{N},$$

where $\bar{p}$ denote a centroid of the point cloud determined according to at least $$\bar{p} = \frac{\sum_{i=1}^{N} p_i}{N},$$

and wherein the eigen vectors and eigen values, of at least $\Lambda=\{\lambda_1, \lambda_2, \lambda_3)\}$, are determined by decomposition of C according to at least $$[\phi_1, \phi_2, \phi_3]\begin{bmatrix} \lambda_1 & 0 & 0 \\ 0 & \lambda_2 & 0 \\ 0 & 0 & \lambda_3 \end{bmatrix}[\phi_1^T, \phi_2^T, \phi_3^T],$$

where superscript$^T$ denotes transpose;
    setting the eigen vectors and eigen values in descending order of at least $\lambda_1 > \lambda_2 > \lambda_3$, wherein unit vectors of the input point cloud are denoted by x=(1, 0, 0), y=(0, 1, 0), z=(0, 0, 1); and performing chucking along the axis, denoted as v*, and whose inner product with $\phi_1$ has a largest absolute value, according to at least $$v^* = \arg\max_{v \in \{x,y,z\}} |v \cdot \phi_1|.$$

2. The method of claim 1, further comprising:

obtaining a plurality of missed points which are included in the input point cloud and are not included in the first plurality of points and the second plurality of points; and generating the video stream based on the at least one texture image, the at least one geometry image and the plurality of missed points.

3. The method of claim 1, further comprising:

determining the bounding box of the input point cloud;

determining one or more axes, including the axis, of the bounding box; and dividing the input point cloud into the plurality of chunks based on the one or more axes.

4. The method of claim 3, wherein the plurality of chunks are aligned along one from among a longest axis of the one or more axes, or a shortest axis of the one or more axes.

5. The method of claim 3, further comprising:

selecting an eigen vector from among the eigen vectors, wherein the eigen vector corresponds to a largest eigen value from among eigen values corresponding to the eigen vectors;

selecting the axis as being closest to the eigen vector from among the one or more axes; and dividing the input point cloud into the plurality of chunks along the axis.

6. The method of claim 3, wherein the plurality of chunks are aligned along the axis from among the one or more axes and a second axis from among the one or more axes, and wherein the input point cloud is entirely contained within the bounding box.

7. The method of claim 6, further comprising:

selecting a first eigen vector and a second eigen vector from among the eigen vectors, wherein the axis is closest to the first eigen vector from among the one or more axes, and wherein a second axis is closest to the second eigen vector from among the one or more axes.

8. The method of claim 1, wherein a number of the first plurality of points is equal to a number of the second plurality of points.

9. The method of claim 1, wherein the input point cloud represents a human body; and wherein the plurality of chunks are selected based on a body part segmentation performed on the input point cloud.

10. The method of claim 1, wherein metadata of the video stream indicates at least one from among an indication of whether chunking is used to encode the video stream, a number of the plurality of chunks, an origin point of a boundary box of the input point cloud, and a size of the boundary box.

11. An apparatus for encoding a video stream using video point cloud coding, the apparatus comprising:

at least one memory configured to store program code; and at least one processor configured to read the program code and operate as instructed by the program code, the program code comprising:

obtaining code configured to cause the at least one processor to obtain an input point cloud;

dividing code configured to cause the at least one processor to divide the input point cloud into a plurality of chunks, including a first chunk comprising a first plurality of points and a second chunk comprising a second plurality of points, based on determining that the chunks are aligned with an axis of a bounding box of the input point cloud, wherein the second plurality of patches is different from the first plurality of patches, the first plurality of points being a first sub-point cloud of the input point cloud, and the second plurality of points being a second sub-point cloud of the input point cloud;

first generating code configured to cause the at least one processor to apply a patch generation process to the first chunk to generate a first plurality of patches based on the first plurality of points;

second generating code configured to cause the at least one processor to apply the patch generation process separately to the second chunk to generate a second plurality of patches based on the second plurality of points;

packing code configured to cause the at least one processor to pack the first plurality of patches and the second plurality of patches;

third generating code configured to cause the at least one processor to generate at least one texture image based on the packed first plurality of patches and the packed second plurality of patches;

fourth generating code configured to cause the at least one processor to generate at least one geometry image based on the packed first plurality of patches and the packed second plurality of patches; and fifth generating code configured to cause the at least one processor to generate the video stream based on the at least one texture image and the at least one geometry image, wherein dividing the input point cloud into the plurality of chunks comprises:

determining eigen vectors, of at least $\Phi=\{\phi_1, \phi_2, \phi_3\}$, by estimating a covariance matrix of the input point cloud with N points according to at least $$C = \frac{\sum_{i=1}^{N}(p_i - \bar{p})(p_i - \bar{p})^T}{N},$$

where $\bar{p}$ denote a centroid of the point cloud determined according to at least $$\bar{p} = \frac{\sum_{i=1}^{N} p_i}{N},$$

and wherein the eigen vectors and eigen values, of at least $\Lambda=\{\lambda_1, \lambda_2, \lambda_3\}$, are determined by decomposition of C according to at least $$[\phi_1, \phi_2, \phi_3] \begin{bmatrix} \lambda_1 & 0 & 0 \\ 0 & \lambda_2 & 0 \\ 0 & 0 & \lambda_3 \end{bmatrix} [\phi_1^T, \phi_2^T, \phi_3^T],$$

where superscript$^T$ denotes transpose;
setting the eigen vectors and eigen values in descending order of at least $\lambda_1 > \lambda_2 > \lambda_3$, wherein unit vectors of the input point cloud are denoted by x=(1, 0, 0), y=(0, 1, 0), z=(0, 0, 1); and
performing chucking along the axis, denoted as v*, and whose inner product with $\phi_1$ has a largest absolute value, according to at least $$v^* = \arg\max_{v \in \{x,y,z\}} |v \cdot \phi_1|.$$

12. The apparatus of claim 11, wherein the obtaining code comprises first obtaining code, and
wherein the program code further comprises:
second obtaining code configured to cause the at least one processor to obtain a plurality of missed points which are included in the input point cloud and are not included in the first plurality of points and the second plurality of points; and
sixth generating code configured to cause the at least one processor to generate the video stream based on the at least one texture image, the at least one geometry image and the plurality of missed points.

13. The apparatus of claim 11, wherein the program code further comprises:
first determining code configured to cause the at least one processor to determine the bounding box of the input point cloud; and
second determining code configured to cause the at least one processor to determine one or more axes, including the axis, of the bounding box, and
wherein the dividing code is further configured to cause the at least one processor to divide the input point cloud into the plurality of chunks based on the one or more axes.

14. The apparatus of claim 13, wherein the plurality of chunks are aligned along one from among a longest axis of the one or more axes, or a shortest axis of the one or more axes.

15. The apparatus of claim 13, wherein the program code further comprises:
first selecting code configured to cause the at least one processor to select an eigen vector from among the eigen vectors, wherein the eigen vector corresponds to a largest eigen value from among eigen values corresponding to the eigen vectors;
second selecting code configured to cause the at least one processor to select the axis as being closest to the eigen vector from among the one or more axes, and
wherein the dividing code is further configured to cause the at least one processor to divide the input point cloud into the plurality of chunks along the axis.

16. The apparatus of claim 13, wherein the plurality of chunks are aligned along the axis from among the one or more axes and a second axis from among the one or more axes.

17. The apparatus of claim 11, wherein a number of the first plurality of points is equal to a number of the second plurality of points.

18. The apparatus of claim 11, wherein the input point cloud represents a human body; and
wherein the plurality of chunks are selected based on a body part segmentation performed on the input point cloud.

19. The apparatus of claim 11, wherein metadata of the video stream indicates at least one from among an indication of whether chunking is used to encode the video stream, a number of the plurality of chunks, an origin point of a boundary box of the input point cloud, and a size of the boundary box.

20. A non-transitory computer-readable medium storing computer instructions for encoding a video stream using video point cloud coding that, when executed by at least one processor, cause the at least one processor to:
obtain an input point cloud;
divide the input point cloud into a plurality of chunks, including a first chunk comprising a first plurality of points and a second chunk comprising a second plurality of points, based on determining that the chunks are aligned with an axis of a bounding box of the input point cloud, the first plurality of points being a first sub-point cloud of the input point cloud, and the second plurality of points being a second sub-point cloud of the input point cloud;
apply a patch generation process to the first chunk to generate a first plurality of patches based on the first plurality of points;
apply the patch generation process separately to the second chunk to generate a second plurality of patches based on the second plurality of points, wherein the second plurality of patches is different from the first plurality of patches;
pack the first plurality of patches and the second plurality of patches;
generate at least one texture image based on the packed first plurality of patches and the packed second plurality of patches;
generate at least one geometry image based on the packed first plurality of patches and the packed second plurality of patches; and
generate the video stream based on the at least one texture image and the at least one geometry image,
wherein dividing the input point cloud into the plurality of chunks comprises:
determining eigen vectors, of at least $\Phi=\{\phi_1, \phi_2, \phi_3\}$, by estimating a covariance matrix of the input point cloud with N points according to at least $$C = \frac{\sum_{i=1}^{N}(p_i - \bar{p})(p_i - \bar{p})^T}{N},$$

where $\bar{p}$ denote a centroid of the point cloud determined according to at least $$\bar{p} = \frac{\sum_{i=1}^{N} p_i}{N},$$

and wherein the eigen vectors and eigen values, of at least $\Lambda=\{\lambda_1, \lambda_2, \lambda_3\}$, are determined by decomposition of C according to at least $$[\phi_1, \phi_2, \phi_3]\begin{bmatrix} \lambda_1 & 0 & 0 \\ 0 & \lambda_2 & 0 \\ 0 & 0 & \lambda_3 \end{bmatrix}[\phi_1^T, \phi_2^T, \phi_3^T],$$

where superscript $^T$ denotes transpose;

setting the eigen vectors and eigen values in descending order of at least $\lambda_1 > \lambda_2 > \lambda_3$, wherein unit vectors of the input point cloud are denoted by x=(1, 0, 0), y=(0, 1, 0), z=(0, 0, 1); and performing chucking along the axis, denoted as v*, and whose inner product with $\phi_1$ has a largest absolute value, according to at least $$v^* = \arg\max_{v \in \{x,y,z\}} |v \cdot \phi_1|.$$

* * * * *